July 14, 1970   G. H. TRIPP   3,520,545
CHUCKS

Filed Oct. 21, 1966   4 Sheets-Sheet 1

Guy H. Tripp
INVENTOR.

July 14, 1970  G. H. TRIPP  3,520,545
CHUCKS
Filed Oct. 21, 1966  4 Sheets-Sheet 3
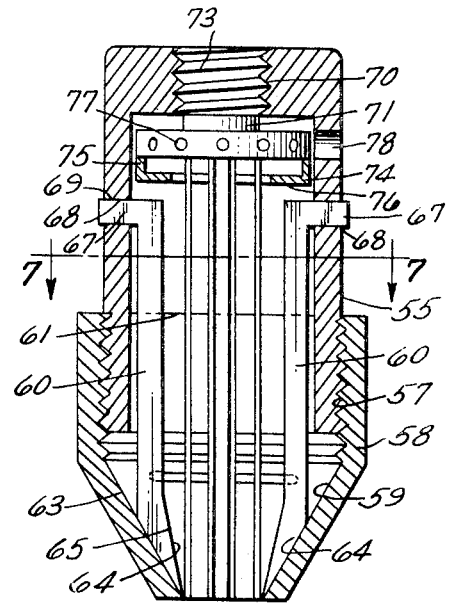
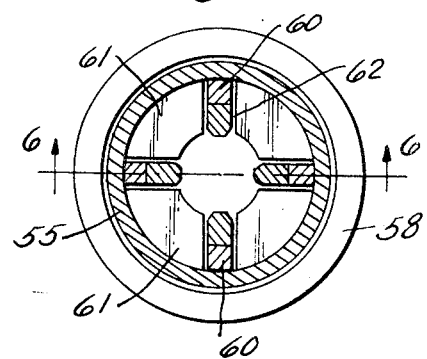
INVENTOR
Guy H. Tripp July 14, 1970     G. H. TRIPP     3,520,545

CHUCKS

Filed Oct. 21, 1966     4 Sheets-Sheet 4

Guy H. Tripp
INVENTOR.

United States Patent Office 3,520,545
Patented July 14, 1970

3,520,545
CHUCKS
Guy H. Tripp, 209 N. Columbian Road,
Bay City, Mich. 48706
Filed Oct. 21, 1966, Ser. No. 604,089
Int. Cl. B23b *31/16*
U.S. Cl. 279—56                                           3 Claims

ABSTRACT OF THE DISCLOSURE

This invention relates to a chuck of the self-centering type which can be employed with tools having both tapered and cylindrical shanks.

---

This invention relates to chucks for gripping the shanks of drills, reamers and related tools and more particularly to a self-centering chuck which can be employed with tools having tapered shanks as well as with tools having cylindrical shanks.

One of the prime objects of my invention is to design a chuck in which a plurality of circumferentially disposed jaws are adjustable radially and axially into gripping engagement with the shank of a tool.

Another object of the invention is to provide a chuck in which a plurality of circumferentially arranged gripping jaws are employed as levers to obtain a superior clamping action, which minimized cutting vibration and precludes the possibility of the tool snapping out of the chuck during the cutting operation.

A further object of the invention is to provide a chuck of rugged and durable design which can be easily loaded and unloaded with very little effort in a minimum length of time.

Another object of the invention is to design a chuck which can be employed with tool shanks of varying size and which is well adapted for production operations of all kinds though not restricted thereto.

A further object of the invention is to design a chuck of simple and practical construction which is comprised of an integral body having a minimum number of rugged operating parts which are self-centering and which will continue to clamp the tool or work piece in true axial alignment after long and sustained use.

Another object of the invention is to provide a chuck in which the full length of the elongated gripping jaws may be brought into clamping engagement with the tool or work piece, if desired to provide gripping surfaces of large area over which the clamping forces are uniformly distributed.

A further object of the invention is to design a chuck in which lever-like gripping jaws are freely disposed within the chuck body and are movable angularly relative to the axis thereof to grip tapered shanks or work pieces.

Another object of the invention is to provide a chuck in which lever-like gripping jaws may be wedged into locked position in relation with the tools or work pieces.

A still further object of the invention is to design a chuck which can be very economically manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details or construction, without departing from the spirit, or sacrificing any of the advantages of the invention.

Figure 3:
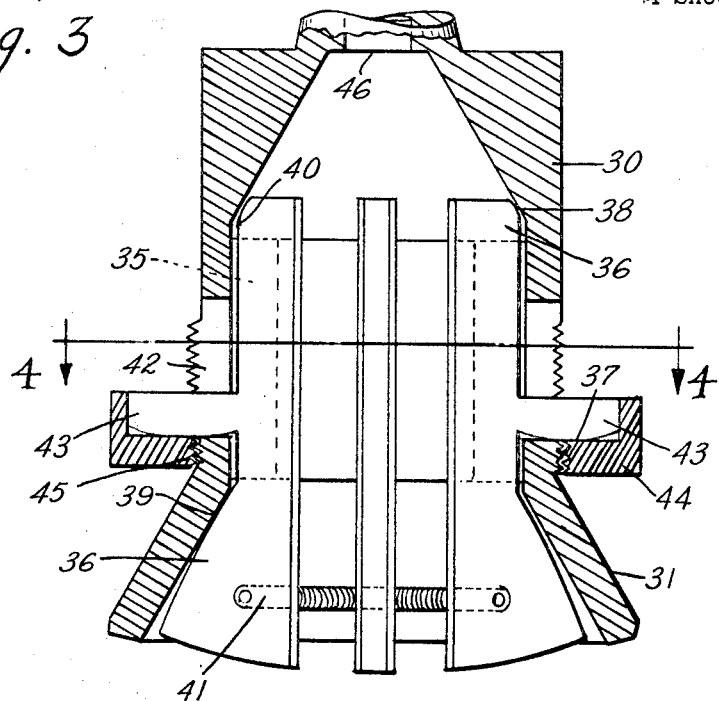
FIG. 3 is a sectional elevational view on another embodiment of the chuck.
Figure 5:
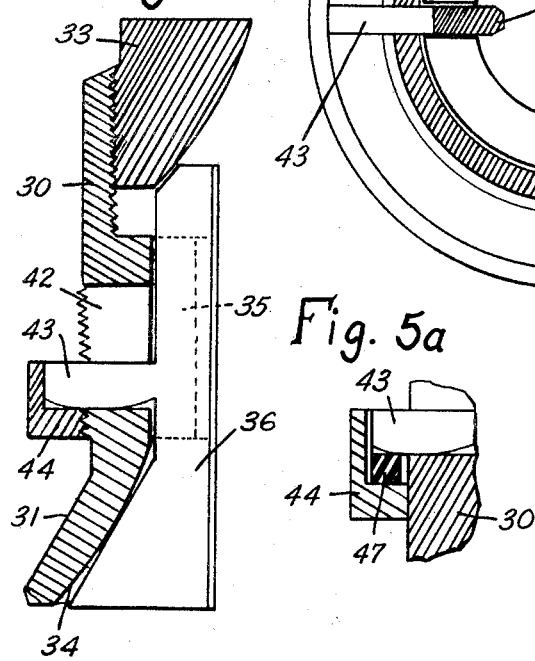
FIG. 5 is a view similar to FIG. 3 illustrating a means for locking the jaws in closed position.
Figure 5A:
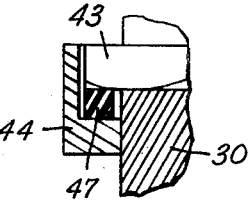

FIG. 5′ is a sectional view showing the use of a washer of yielding material that may be used between the ears and annular ring in FIG. 3.

FIG. 6 is a sectional elevational view of another embodiment of the invention.

FIG. 7 is a transverse sectional view taken on the line 7—7 of FIG. 6.

Figure 8:
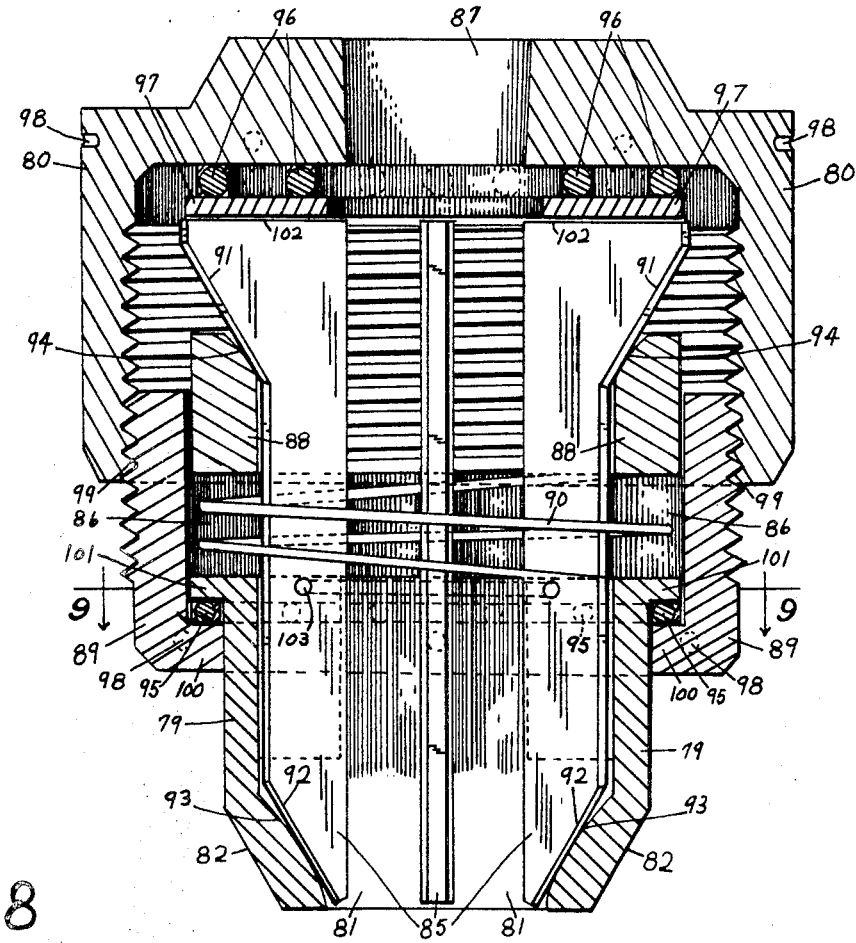

FIG. 8 is a sectional elevational view of another embodiment of the invention.

Figure 9:
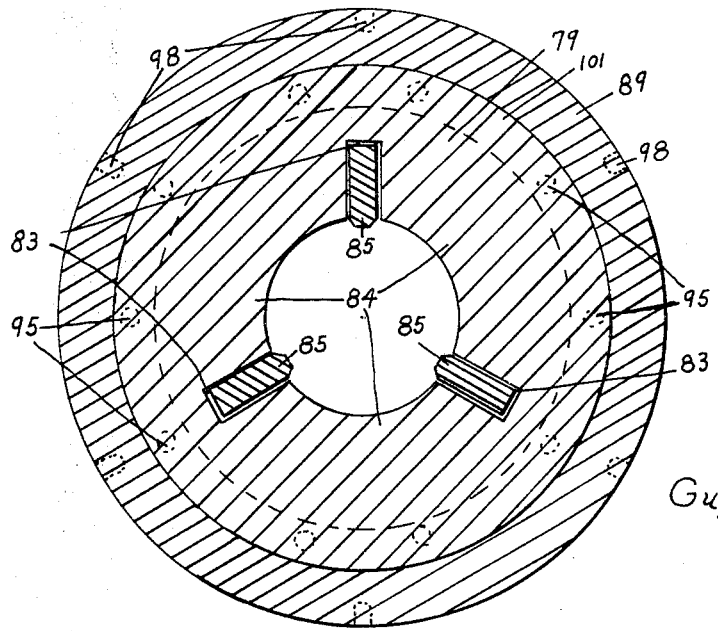

FIG. 9 is a cross-sectional view taken at 9—9 of FIG. 8.

Figure 1:
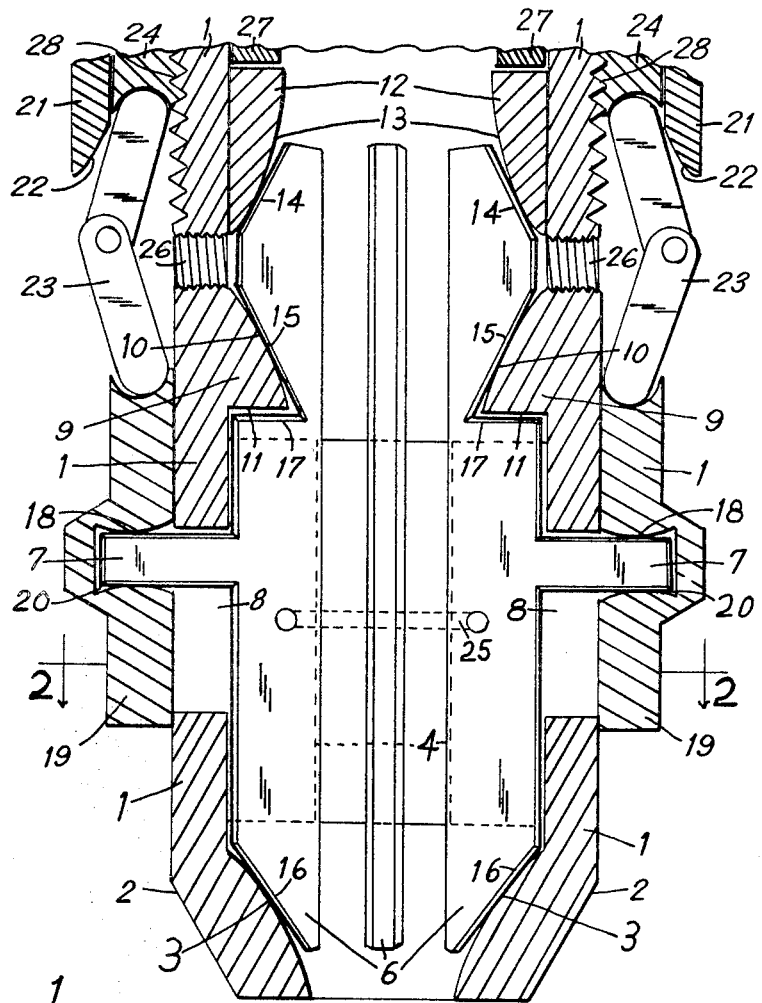
FIG. 1 is a sectional elevational view taken through a chuck embodying the invention with the gripping jaws in open position.
Figure 2:
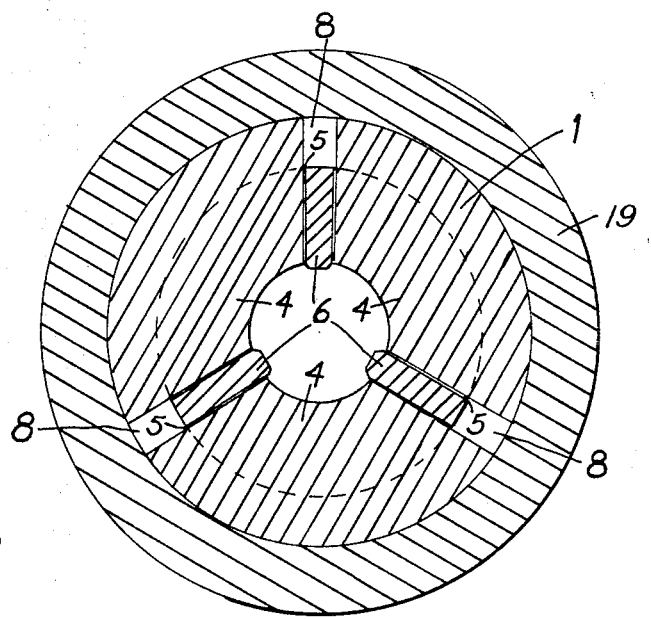
FIG. 2 is a transverse sectional view taken on the line 2—2 of FIG. 1.

The embodiment shown in FIGS. 1 and 2 shows a chuck which comprises a unitary hollow cylindrical body 1 having an inward taper 2 at one end and the opposite open end having a sliding camming ring 12 with an arcuate shaped inner surface 13. A multiplicity of integral guide ribs 4 are formed on the interior wall of chuck body 1 (three shown) at circumferentially spaced-apart points to freely receive a multiplicity of elongated gripping jaws 6 (three shown) therebetween. It will be seen that the jaws 6 are normally retained in open position by annular spring 25. On the interior wall and toward the open end of chuck body 1 and adjacent the ribs 4 a shoulder projection 9 having an arcuate cam surface 10 is shouldered at 11, there also being an arcuate cam surface 3 on the interior surface of the inward taper 2 of chuck body 1. Each of the jaws 6 have three tapers: Taper 14 to coact with sliding arcuate annular cam 12 at 13, taper 15 to coact with the arcuate cam surface 10 of shoulder projection 9 and taper 16 to coact with arcuate annular cam surface 3 of the inward taper 2 of the body 1. The jaws 6 are shouldered at 17 to conform to the shoulder 11 of the shoulder projection 9 and have ear projections 7 which contact an arcuate annular cam surface in groove 20 at 18. The ears 7 extend through elongated slots 8 constructed in body 1 in alignment with grooves 5 holding jaws 6 and allowing ample space for the movement of the ears 7. The jaws 6 are guided by a sliding sleeve 19 which has an annular groove 20 containing an arcuate annular cam surface at 18 and in which the ends of the ear projections 7 rest. The sliding sleeve 19 is motivated by toggle levers 23 the ends of which bear against the sliding sleeve 19 and the nut 24 which is threaded and engages threads on body 1 at 28. The threaded nut 24 is for the purpose of adjusting the position of toggle levers 23, the toggle levers being activated by a closing ring 21 having an arcuate annular cam surface at 22. Means of operating closing ring 21 are not shown but can be any power means. Threaded openings 26 in the wall of the chuck body 1 accommodates any suitable screw which positions on jaws 6 in a suitable place to align the jaws 6 so they can position a boring tool for off-center work.

In operation the chuck body 1 is attached to the machine tool combination by convenient arrangement of desired size and shape which is no part of this invention. If we desire to hold bar stock tubing or any desired material, as in an automatic etc., with the jaws in open position, the stock is fed from the open end of body 1, arrangement being made to operate the closing ring 21 toward the open end of the chuck body 1, as shown, but the closing ring 21 can be made to move in the opposite direction if desired. The motivation of the closing ring 21 forces the toggle levers 23 against the sliding sleeve 19 causing the sliding sleeve 19 to move toward the taper end 2 of the body 1 thus causing the jaws 6 to move inward by means of the ear projections 7 being held in the annular groove 20 of the sliding sleeve 19 and the arcuate cam 3 coacting with the tapers 16 on the jaws 6 results in a closed position of the jaws 6. At the same time the camming plunger 27 pressing against the sliding camming ring 12 which in turn exerts pressure on the jaws at 13 forcing the tapers 15 of the jaws 6 to slide against the arcuate surface 10 of the shoulder projection 9 also camming the jaws 6 laterally and centrally to a closing position. The camming actions of the sliding camming ring 12, the sliding sleeve 19, the shoulder projection 9 at 10 and the arcuate annular cam 3 adds to the levering gripping and locking action of jaws 6 radially, axially, centrally and linearly in relation to straight or taper shanks. The knee action of the toggle levers 23 is a very powerful mechanical action.

Figure 4:
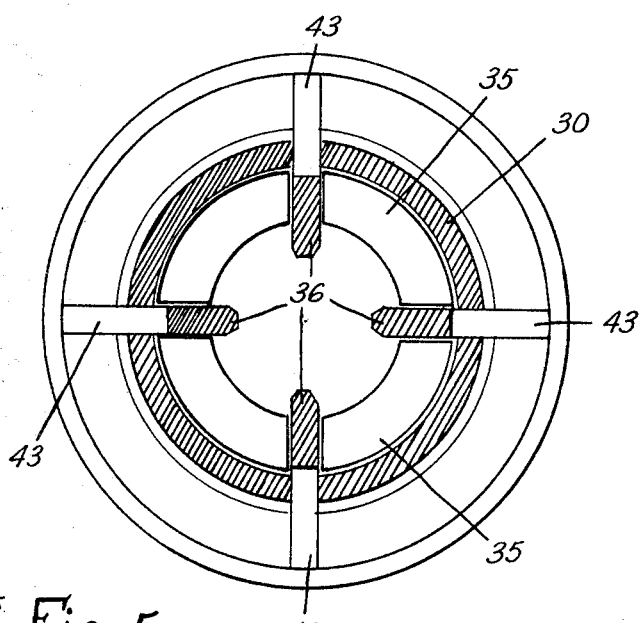
FIG. 4 is a transverse sectional view thereof taken on the line 4—4 of FIG. 3.

In FIGS. 3 and 4, I have shown an embodiment of my invention in which the one end of the hollow cylindrical chuck body 30 is outwardly flared, as at 31, while the opposite end 32 is formed to accommodate an integral tapered shank, not shown and not a part of this invention or a centrally disposed passage 46 may be provided in the shank end 32 to admit bar or rod stock to the chuck, if it is desired to employ the chuck in automatics or screw machines, and it will be apparent that if the chuck were to be used in this manner, the collar 44 would be adjusted by mechanical means in timed sequence. The central portion of the interior wall of the chuck body 30 is formed with a multiplicity of circumferentially spaced-apart guide ribs 35 (four shown) between which are freely disposed a multiplicity of elongated jaws 36 being held from lateral movement thereby. The lower edges of the jaws 36 are curved outwardly having an arcuate surface, as at 39 while the opposite ends of the jaws 36 are curved inwardly to cooperate with the inner tapered wall 38 of the chuck body 30, the jaws 36 being retained in normally open position by an annular spring 41. An arm 43 having an arcuate shape at 37 is formed on each jaw 36 intermediate their length and passes through the elongated slots 42, being of greater length than the width of the arms 43, constructed in the chuck body 30, the slots 42 being in alignment with arms 43 and jaws 36. An adjusting collar 44 is threaded on the outer wall of the body 30, as at 45, and bears against the arcuate face 37 of the arms 43.

When the collar 44 is adjusted axially, the outward tapered ends of the jaws 36 are cammed inwardly by the tapered action of collar 44 on the arms 43 and the inwardly tapered ends of the jaws 36 are cammed inwardly by the tapered wall, as at 38. The jaws 36, in moving axially and radially into clamping engagement, are maintained in substantial lineal position with relation to the work piece or tool shank, either straight or tapered that is to be held in this chuck.

FIG. 5 shows much the same kind of device as shown in FIGS. 3 and 4 except that FIG. 5 shows an annular cam nut 33 instead of the tapered wall 38 in FIG. 3. The annular cam nut 33 exerts pressure on the inward curved ends of the multiplicity of jaws 36 forcing them into a gripping and locking position on a straight or taper work piece. Threads on the inner wall of the body 30 and the outer wall of annular cam nut 33 shows a way of activating the annular cam nut 33 but smooth walls on body 30 and cam nut 33 will allow the device to be operated by air, hydraulic or electric solenoid; the threads are shown to give a way of operating by hand.

FIG. 5' shows a sectional view wherein the collar 44 is slidable on the outer wall of the chuck body 30, a yielding material washer 47 of considerable thickness being provided between the collar 44 and the arms 43 of the jaws 36. The collar 44, without threads, is moved axially by mechanical means (not shown) to open and close the jaws 36 automatically.

In FIGS. 6 and 7, I have shown still another embodiment of the invention in which the chuck body 55 is cylindrical in shape. The lower end of the body 55 is threaded, as at 57, to receive a truncated, conical sleeve 58 which is provided with an inwardly tapering wall 59. Outer or main jaws 60 are provided between circumferentially disposed ribs 61, and inner auxiliary jaws 62 are secured thereto but are axially adjustable with respect to the jaws 60. The lower edges of the jaws 60 are sloped inwardly, as at 63, to conform to the tapered wall 59, and the opposite faces thereof are sloped, as at 64, the outer edges of the jaws 62 being sloped as at 65, to conform thereto.

The interior of the inwardly tapering wall 59 holds the ends of the jaws 60 a spaced distance from the interior wall of the chuck body 55 to provide a working clearance therebetween. The upper ends of the jaws 60 are provided with arms 67 carried in slots 68 formed in the body 55 and are adjustable slightly therein in a direction parallel to the vertical axis of the chuck. The interior wall of the body 55 is shouldered, as at 69, to prevent upward movement of the jaws 60.

Provided in the upper end of the chuck is a reduced, threaded passage 70 in which is disposed the shank 71 of a nut 72, the upper end of the shank being enlarged and threaded, as at 73. An operating ring 74, is formed with an inwardly projection flange 75, is provided on the nut 72 and engages in slots 76 provided in the upper ends of the inner jaws 62. A plurality of circumferentially spaced openings 77 are provided in the peripheral wall of the head of the nut 72, and a slotted opening 78 in the body 55 permits the entrance of a pin (not shown) which can be inserted in one of the openings 77 to actuate the nut and adjust the jaws 62 with relation to the main jaws 60.

In operation, the shank of the cutting tool (not shown) which has been inserted into the chuck, is initially gripped by adjusting the sleeve 58, thus camming the outer ends of the jaws 60 and 62 into clamping engagement, and adjustment of the nut 72 downwardly wedges them tightly into gripping relation. The jaws can be readily released, of course, by merely adjusting the nut 72 in the opposite direction.

FIG. 8 is a side elevational view of still another embodiment of my invention and FIG. 9 is a cross-section taken at 9—9 of FIG. 8. This embodiment consists of few parts and has strong gripping action and can be used on a rotatable shaft by means of a shank or nested in a holding device on or in an automatic or screw machine etc., the shank or nesting device is not shown and is not a part of this invention. This chuck can be rotated or held in a stationary position when the work rotates.

FIG. 8 shows a hollow cylindrical chuck with a body having a plurality of parts, a two piece body construction is shown with body part 79 and body part 80 being held together by a sleeve 89 having external threads to engage the internal threads of body part 80, as at 99, the sleeve 89 having an internally projected flange 100 which controls body part 79 by means of the outwardly projected flange 101 on body part 79 there being a retainer with ball bearings 95 between flange 100 and flange 101. The body part 79 has a central part 81 parallel to the longitudinal axis of the body part 79 and having a multiplicity of grooves 83 circumferentially spaced apart on the interior wall of body part 79 parallel to the longitudinal axis of the body part 79 and extending from the cone end 82 to the flange 101 is the body part 79. The grooves 83 contain a multiplicity of freely disposed strong rigid elongated jaws 85 (three shown) which are restrained from lateral movement by the guide ribs 84 formed by the grooves 83 the guide ribs 84 being parallel to the longitudinal axis of the body part 79 and extending toward the center of body part 79. The exterior of the body part 79 has a cone shape 82 at one end and an outwardly projected flange 101 at the opposite end, the interior surface of the cone end 82 having an arcuate surface forming an arcuate annular cam 93. A sliding ring 88, intermediate the body part 79 and the body part 80, having an arcuate surface at 94 is activated by a spring 90 which is held in a spring cage 86 formed by the flat end of the sliding ring 88 and the flat surface of the flange 101. The jaws 85 have tapers 91 and 92 which are parallel to each other, the taper 91 coacting with the arcuate surface 94 on the sliding ring 88 and taper 92 coacting with the arcuate annular cam 93 of the cone end 82 of the body part 79. The body part 80 has a central bore 87 with the same longitudinal axis as the body part 79, the walls of the central bore being tapered to accommodate a Morse taper shank or as an opening to accept bar stock. Plate 97 with a retainer containing ball bearings 96 between the plate 97 and the inner surface of body part 80 acts as a cam on jaws at 102. The sleeve 89, sliding ring 88 and the body parts 79 and 80 all have the same longitudinal axis. The jaws 85 are held in a normal outward position by spring 103. The drilled holes 98 in body part 80 and threaded sleeve 89 are to provide for the use of a spanner wrench when camming the jaws 85 into gripping and ungripping action.

The telescoping action of body part 80 and threaded sleeve 89 exerts pressure on plate 97 causing cam action on jaws 85 at 102 and also activates the spring 90 exerting pressure of the sliding ring 88 which in turn cams jaws 85 at 94 into a central position radially. At the same time the body part 79 moving in close relation to the threaded sleeve 89 cams the jaws 85, by an axial movement, into a gripping action. It is understood that any means can be used to telescope these parts to activate them. It is also understood that smooth moving part can be substituted in place of threads, when so desired, and the parts can be activated by means of air cylinders, solenoids or hydraulic power.

The expression "longitudinal axis of the body" is meant to mean an axis extending lengthwise of the body symmetrically in relation to the body of the chuck and around which the chuck rotates when mounted on a rotatable member.

Having described my invention what I claim is:

1. A chuck comprising a hollow body provided with a movable internally tapered annular arcuate cam at one end and the opposite end of said body member flaring outwardly, the inner surface of said outwardly flared wall of said chuck body being an inner annular arcuate cam, on the inner wall of said body member and intermediate the ends is a multiplicity of grooves, elongated jaws are disposed therein freely movable both axially and radially, means to lock and unlock said jaws and return to and hold it an outward open position when not in clamping position.

2. Device in claim 1 in which said body member is outwardly flared at one end and inwardly tapered at the opposite end, a multiplicity of circumferentially spaced apart guide ribs intermediate the ends of said body member form grooves between said guide ribs, jaws being freely disposed in said grooves for axial and radial movement and restrained from lateral movement thereby, outward extending arms are formed on said jaws intermediate the ends of said jaws, said arms move in elongated slots in said body member, said slots being longer than the width of said arms and in alignment with said jaws and said grooves, the portions near the ends of said jaws being formed with arcuate cam surfaces to cooperate with the inner wall of the tapered and flared portions of said body member, means to move and pivot said jaws axially and radially into clamping and gripping position both centrally and lineally on taper and straight work pieces, an axially disposed passage is provided in said body member communicating with the interior of said body member to admit bar stock thereto, means to lock and unlock said jaws and return to outward open position, shank means on said body member.

3. Device in claim 1 in which said jaws are restrained from lateral movement by said guide ribs, outwardly extending arms are formed on said jaws intermediate the ends of said jaws, said arms taking an arcuate shape, said arms extend through elongated slots in said body member, said slots being longer than the width of said arms and in alignment with said jaws and said grooves, said elongated jaws having tapered edges adjacent the inner annular cams to coact therewith, means to pivot and move said jaws axially and radially into clamping and gripping position both centrally and linearly on straight and tapered work pieces and hold concentrically in relation to the longitudinal axis of said body member.

References Cited

UNITED STATES PATENTS 2,822,177  2/1958  Tripp _____ 279—58

LESTER M. SWINGLE, Primary Examiner

D. R. MELTON, Assistant Examiner